S. T. Lamb,
Harvester Rake.
No. 14,769          Patented April 29, 1856.
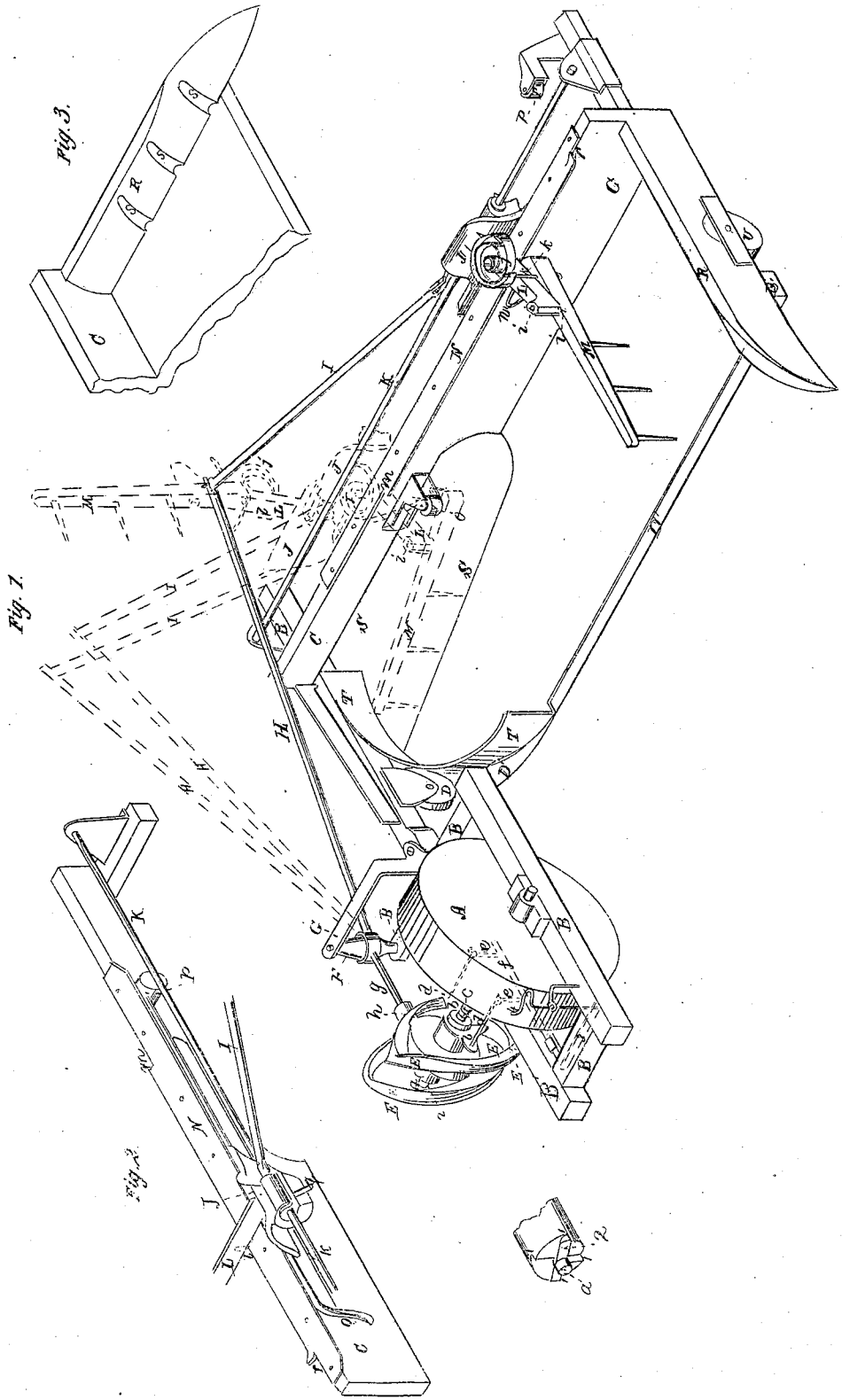

UNITED STATES PATENT OFFICE.

SALEM T. LAMB, OF NEW WASHINGTON, INDIANA.

IMPROVEMENT IN AUTOMATIC RAKES FOR HARVESTERS.

Specification forming part of Letters Patent No. 14,769, dated April 29, 1856.

*To all whom it may concern:*

Be it known that I, SALEM T. LAMB, of New Washington, in the county of Clark and State of Indiana, have invented certain new and useful Improvements in Harvesting-Machines; and I do hereby declare the following to be a full, clear, and exact description of the same, reference being had to the accompanying drawings, making a part thereof, in which—

Figure 1 represents a perspective view of the machine, with three several positions of the rake indicated in black, red, and blue to show its motions. Fig. 2 represents a view from the rear of the platform, showing the devices thereon for aiding the rake in a portion of its movement. Fig. 3 represents a broken view of a portion of the platform which will be referred to in the description.

Similar letters, where they occur in the several figures, denote like parts.

The nature of my invention relates to the raking apparatus, which is worked automatically from the main driving or supporting wheel of the harvesting-machine and delivers the grain in gavels in rear of the driving apparatus.

To enable others skilled in the art to make and use my invention, I will proceed to describe the same with reference to the drawings.

A is the main driving and supporting wheel, on the journals of which is supported by proper bearings a frame, B. The outside piece, B′, of the frame extends back far enough to form a support for one end of the piece C, which forms the rear of the platform, and a small supporting-wheel, D, is arranged on said part B′ to hold the platform from the ground. Another piece, D′, united to the frame B at or near its rear portion, and lying parallel with that C, forms the platform-frame.

On one of the journals $a$ of the wheel A, which is extended for that purpose, is placed a cam-wheel, E, of peculiar form, the outside end of the hub of said cam-wheel being provided with ratchet-teeth 1 1, which catch against a pin, 2, in the point of the journal $a$, and thus causes said cam-wheel E to turn with the main wheel A when the machine is drawn forward; but when the machine is run backward the ratchet-teeth slip past the pin 2, and thus the rake is not worked when the machine is thus moved backward. A plate, $b$, connected with the hub of the cam-wheel, is forced up against it by a spiral spring, $c$, and this keeps the ratchet-teeth in the other end of said hub tight up against the pin 2 in the point of the journal $a$.

To the plate $b$ are attached two rods, $d\ d$, the other ends of said rods being connected to two arms $e\ e$ (in dotted lines) on a rock-shaft, $f$, supported to the frame-piece B′. On one end of the rock-shaft $f$ is an arm, 3, (in dotted lines,) to which a lever, 4, is connected, so that by pressing down said lever 4 by the hand or foot the hub of the cam-wheel will be drawn in toward the main wheel, and its ratchet-teeth drawn away from the pin 2, and consequently uncoupled from the journal or shaft of the main driving-wheel. By releasing the lever 4 the spring $c$ throws the cam-wheel out and couples it with the shaft of the driving-wheel, and the raking apparatus is thus readily coupled or uncoupled, as occasion may require.

Upon the rear transverse piece of the frame B is supported one end of a swiveling stud, F, the other end being supported in a bracket, G, also attached to the frame. To this pivoted or turning stud is attached a short arm, $g$, which has a friction-roll, $h$, on its end, said friction-roll passing into the cam-space between the cam-rings E, and thus a variable turning motion of the stud F is caused, as the throw of the cam-planes are more or less abrupt. On the opposite side of the stud F from the arm $g$ is attached a long arm, H, to the extreme rear end of which is connected a pitman, I, and the opposite end of the pitman I is connected to a cam, J, which travels to and fro on a shaft or rod, K, behind the back C of the platform, as the arm H is vibrated from the cams, as above described. The cam J may also be called the "rake-head," for to an arm, L, which may be cast with the cam J or otherwise secured to it, is pivoted, at $i$, the rake M, and said rake travels with the cam J, but at the same time has other motions independent of the traversing of the cam on its rod K; but the cam itself not only traverses on the rod, but has a rocking or partial rotating motion around the shaft as its axis, as will be explained hereinafter. The bar of the rake M, besides being pivoted at $i$ to the piece or arm L, projects still farther back, and is united at its rear by a helical spring, $j$, through a rod, $k$, so that the rake shall be controlled to a certain extent upon its pivoted point $i$, and not turn thereon until turned by the cams at the proper time and place.

A plate or metallic ledge, N, is secured on top of the piece C, projecting slightly on both sides of C. Underneath this ledge a hook, $l$, Fig. 2, on the arm L, takes, and thus holds the arm and cam or rake from rising vertically until said hook arrives at the point $m$ on said ledge, where it is cut away purposely to allow the hook to run out, for when the rake arrives at this point a projection, $n$, on the rake strikes against a friction-roll, $o$, attached to the piece C, and holds the rear of the rake, or restrains it to a degree, while the front part of the rake still moves on with the arm L. The rake thus held back at one end and carried forward by the arm L turns upon its pivot $i$, and moves in the arc of a circle until it stands at about right angles to its position along the platform, and in doing so coils up the spring $j$. Just as the hook $l$ runs out from under the ledge at $m$ the point of the cam J strikes against a roll, $p$, on the back of C and causes said cam to turn on the shaft K and raise up the rake vertically. The spring $j$ uncoils and returns the rake to the same position with regard to the arm L that it had when traveling longitudinally with the platform. As the cam J rolls on the shaft by striking against $p$, a pin, $q$, thereon, Fig. 2, passes under the ledge behind the board C, and holds the cam, rake, and all in the raised-up position described until the cam traverses back, and its point meets a stop or roll, P, which turns it back around the shaft K, and as the cam turns the pin $q$ is drawn out from under the ledge N. The rake would now drop down; but a cam-ledge, Q, on the back of the board C receives the pin $q$ and lets the rake down gently, and this operation is repeated at every back and forward movement of the cam J. The ledge N is also cut away at $r$, so that when the rake drops the hook $l$ on the arm L may be ready to move along underneath the ledge, as before described.

The board R, which forms the end of the platform, has recesses $s$ cut therein, and when the rake drops onto the platform the teeth of the rake drop down into these recesses and prevent any straw or grain from getting behind the teeth. It must all, of course, be in front of the rake, and when the rake moves it sweeps everything upon the platform. The platform and the rear piece, C, are cut away, as seen at S, Fig. 1, to leave a space, through which the gavel may drop onto the ground in rear of the driving machinery and out of the way of the return-swath. A curved board, T, forms a fence or guide for turning the grain at that end of the platform, so that the rake gathers the gavel at right angles, or rather lengthwise of the straws, and turns them half-round and deposits them at right angles to the swath. There is a supporting-wheel, U, at the extreme end of the platform to hold it up from the ground.

The operation of the rake is as follows, viz: The rake-teeth having dropped into the recesses $s\ s$, they then move along the platform longitudinally, carrying the grain ahead of it, and when the rake reaches the point $o$ it then commences to turn on its pivot $i$ and move in a circular direction until it arrives at the point where the rake is shown in red lines, and there delivers the gavel. This done, the rake is released and rises up, as shown in blue lines, and in this raised position travels back to the end of the platform to repeat a similar operation. The operator, having convenient access to the lever 4, can throw the rake out of gear to allow more grain to accumulate on the platform, and thus when the grain stands thin on the ground still have uniformity in the size of the gavels, for, so soon as sufficient has fallen upon the platform to make the gavel, by simply releasing the lever the rake will be thrown into gear, and commence to sweep the platform. The rake does not at any time, either in clearing the platform or in returning for the next gavel, interfere with the grain which is falling upon the platform, so as to entangle it.

Having thus fully described the nature of my invention, what I claim therein as new, and desire to secure by Letters Patent, is—

Giving the rake its circular motion by means of the traversing and rocking cam J, in connection with the revolving cam E, which gives the longitudinal motion through the intervention of the devices, substantially such as described.

SALEM T. LAMB.

Witnesses:
  A. B. STOUGHTON,
  THOS. H. UPPERMAN.